(12) United States Patent
Wollesen

(10) Patent No.: US 12,550,862 B2
(45) Date of Patent: Feb. 17, 2026

(54) LIVESTOCK STALL DIVERTER SYSTEM

(71) Applicant: COW-WELFARE A/S, Haderslev (DK)

(72) Inventor: Tommy Wollesen, Haderslev (DK)

(73) Assignee: COW-WELFARE A/S, Haderslev (DK)

( * ) Notice: Subject to any disclaimer, the term of this patent is extended or adjusted under 35 U.S.C. 154(b) by 0 days.

(21) Appl. No.: 18/857,547

(22) PCT Filed: Apr. 20, 2023

(86) PCT No.: PCT/EP2023/060240
§ 371 (c)(1),
(2) Date: Oct. 17, 2024

(87) PCT Pub. No.: WO2023/208701
PCT Pub. Date: Nov. 2, 2023

(65) Prior Publication Data
US 2025/0268225 A1  Aug. 28, 2025

(30) Foreign Application Priority Data

Apr. 26, 2022 (EP) .................................. 22169902

(51) Int. Cl.
*A01K 1/00* (2006.01)

(52) U.S. Cl.
CPC .......... *A01K 1/0052* (2013.01); *A01K 1/0011* (2013.01)

(58) Field of Classification Search
CPC .. A01K 1/0088; A01K 1/0011; A01K 1/0017; A01K 1/0023; A01K 1/0029
See application file for complete search history.

(56) References Cited

U.S. PATENT DOCUMENTS

| | | | |
|---|---|---|---|
| 3,168,888 A * | 2/1965 | Brodrick | A01K 5/0275 119/449 |
| 6,318,297 B1 * | 11/2001 | Hatfield | A01K 1/0011 119/516 |
| 6,467,434 B1 * | 10/2002 | Dejonge | A01K 1/0011 119/516 |

FOREIGN PATENT DOCUMENTS

| | | | | |
|---|---|---|---|---|
| GB | 2471707 B | * | 3/2014 | .......... A01K 1/0011 |
| WO | 2010133226 A1 | | 11/2010 | |
| WO | WO-2020129056 A1 | * | 6/2020 | .......... A01K 11/006 |
| WO | WO-2023047392 A1 | * | 3/2023 | .......... A01K 1/0023 |

(Continued)

OTHER PUBLICATIONS

European Patent Office, Extended European Search Report for corresponding application EP22169902.8 dated Oct. 17, 2022, 5 pages.

(Continued)

*Primary Examiner* — Monica L Perry
*Assistant Examiner* — Aaron M Rodzwicz
(74) *Attorney, Agent, or Firm* — J. Peter Paredes; Amin Wasserman Gurnani LLP

(57) ABSTRACT

Herein is described a livestock stall diverter system for a free stall stable, said system comprising a plurality of stall dividers arranged in one or more rows comprising at least one vertical support member and at least one diverter member extending away from the support member, wherein the at least one diverter member is provided a tubular member with a plurality of air apertures, and that said tubular member is connected to an air supply.

20 Claims, 6 Drawing Sheets

(56) References Cited

FOREIGN PATENT DOCUMENTS

WO    WO-2023113687 A1 *   6/2023   ........... A01K 1/0023

OTHER PUBLICATIONS

WIPO/ISA/EPO, International Search Report and Written Opinion issued in corresponding International Application No. PCT/EP2023/060240 on Jun. 28, 2023, 13 pages.

* cited by examiner

LIVESTOCK STALL DIVERTER SYSTEM

CROSS-REFERENCE TO RELATED APPLICATIONS

The present application claims priority to PCT application serial no. PCT/EP2023/060240, filed Apr. 20, 2023, which claims priority to European patent application serial no. 22169902.8, filed Apr. 26, 2022, each herein incorporated by reference in their entireties.

FIELD OF THE INVENTION

The present invention relates to a livestock stall diverter system for a free stall stable, said system comprising a plurality of stall dividers arranged in one or more rows comprising at least one vertical support member and at least one diverter member extending away from the support member.

The invention also relates to a free stall stable and method of providing air conditioning for animals in the free stall stable.

BACKGROUND OF THE INVENTION

Such stall diverter systems comprising a plurality of stall dividers positioned side by side are known from e.g. WO 2010/133226A1. Such stall diverter comprises a pair of vertically oriented posts provided in a row with diverter members extending from these posts thereby forming compartments for the animals. Other examples of such cattle handling systems for livestock free stalls are known from U.S. Pat. No. 6,467,434 B1 and U.S. Pat. No. 6,318,297 B1.

In particular the system disclosed in WO 2010/133226A1 provides comfort and welfare for the animals due to bendable and deflectable diverters that reduces the risk of injuring the animals. However, it is realised that although a cow when resting in the compartments are well and then produces more milk, there is still an issue regarding the comfort due to temperature in the stable. This is in particular a problem during summer months and in some warmer regions on the planet. If a cow is experiencing temperatures above approx. 20° C. the heat causes discomfort and less production of milk.

Thus, it is an object of the present invention to provide a stall diverter system for a livestock free stall which improves the comfort of the livestock handled therein.

SUMMARY OF THE INVENTION

This object is achieved in a first aspect of the invention by providing a livestock stall diverter system for a free stall stable, said system comprising a plurality of stall dividers arranged in one or more rows comprising at least one vertical support member and at least one diverter member extending away from the support member, wherein the at least one diverter member is provided a tubular member with a plurality of air apertures, and that said tubular member is connected to an air supply.

In the currently preferred embodiment, the at least one tubular member is integrated in the at least one diverter member, which is provided as an elongated tubular member with an inner hollow space and with a plurality of air apertures, and that said hollow space is connected to an air supply.

In an alternative embodiment, the at least one tubular member with a plurality of air apertures is attached to the at least one diverter member and connected to the air supply.

In a second aspect, the invention also concerns a free stall stable comprising a livestock stall diverter system, wherein at least a single row of support posts is provided with diverter members pointing in the same direction and with the manifold provided above said row and providing air supply to the diverter members of the at least one row.

According to a third aspect of the invention, there is also provided a method of providing air conditioning for animals in a free stall stable, said method comprising the steps of providing a livestock stall diverter system of the kind according to the first aspect comprising a plurality of stall dividers arranged in one or more rows comprising at least one vertical support member and at least one diverter member extending away from the support member, wherein the at least one diverter member is provided a tubular member with a plurality of air apertures, and that said tubular member is connected to an air supply, for instance where the tubular member is incorporated in the at least one diverter member, which is provided as an elongated tubular member with an inner hollow space and with a plurality of air apertures, and that said hollow space is connected to air supply, and providing an airflow through the apertures in the at least one diverter member by providing a manifold which is in fluid communication with the inner space of said at least one diverter member, and supplying air to said manifold.

By the invention, there is advantageously provided an air ventilation integrated in the stall diverters so that the animals, in particular cows, can experience a comfortable cooling air breeze when standing or laying down in the compartments in the free stall. The airflow through the apertures in the diverter members cools the cows in the vicinity of the diverter members. The air is supplied to the inner hollow space of the diverter members with a plurality of air apertures, and that this hollow space is connected to air supply. The air is preferably blown or sucked into the barn from the outside and provides a comfortable cooling effect for the cows in the stall compartments between the diverter members as well as a general ventilation of the free stall.

This solution is advantageous since cattle tends to get heat stress when the temperature exceeds approx. 20° C. or so and the cows can then seek out the cooling effect when the animals want simply by finding a place in the free stall next to an air ventilated diverter in the stall diverter system according to the invention. For dairy cows, this results in a production loss which is considerable in particular when the dairy productions is in hot climates. It is moreover advantageous that the livestock stall diverter system allows for the cows to lay down as they are cooled since it is known that dairy cows produce more milk when they are laying down.

In preferred embodiments of the invention, a plurality of diverter members extend away from the at least one vertical support member. In particular, the plurality of diverter members comprise an upper diverter member and a lower diverter member, wherein at least the upper diverter member is provided with air apertures. Hereby, an advantageous design of the stall diverter system is achieved which is comfortable for the animals as well as relatively simple to install in the barn. In a particular embodiment thereof, the upper diverter and the lower diverter are formed in one piece with a curved distal section or connected to each other by a curved section. Hereby, pointy distal ends of the diverters can be avoided.

Preferably, the stall diverter system comprises at least one crossing member extending perpendicularly to the plurality of diverter members, preferably being arranged on the upper diverter members by being mounted thereon. This at least one cross member may also be provided with apertures and connected to the air supply.

In a preferred embodiment, the at least one diverter member and/or the at least one crossing member are provided with a coating of a soft or elastic material, such as rubber, a polymer or the like. This ensures a soft surface texture and thereby increases the comfort of the animals.

The at least one diverter member, the at least one support member and/or the at least one crossing member may be made of metal tubes, such as galvanised steel. This allows for a cost effective manufacturing of the stall diverter system. Alternatively, the at least one diverter member, the at least one support member and/or the at least one cross member may be made of a bendable or deflectable material, such as plastic or glass fibres. This is an inexpensive choice of material and allows for an increase in the comfort and welfare of the animals in the stall diverter system according to the invention.

Advantageously, the air supply comprises an air supply source and a manifold for supplying air to a plurality of diverter members. Furthermore, the manifold is preferably connected to a series of supply tubes for providing fluid communication between the manifold and each of the at least one diverter member. The supply tubes may be flexible hoses connected to more rigid connector tubes on the support post and/or he diverter members and/or the crossing members.

The manifold is advantageously connected to an air supplier, such as a blower, for providing an airflow in the manifold and into the at least one diverter member and out through the apertures therein. Preferably, the manifold is a flexible hose adapted for being mounted above the stall diverters. This arrangement of the air supply system facilitates mounting in a barn house and manufacturing off-site as it allows for compact storage and thereby easy transport to the building where it is to be mounted.

Advantageously, the air supply source is an air blower or an air suction provider, such as a compressor or an air suction pump, preferably provided outside the barn so that fresh air is drawn into the free stall inside the barn. This ensures a comfortable air conditioning system for the animals in the stall as well as an air ventilation of the stable.

The airflow to the animals may be provided by the manifold provided above said one or more rows of stall diverters. By providing the manifold above the stall diverter system efficient use of the space in the stable or barn is made.

In some configurations of the stall diverter system, it is found advantageous that the manifold is common to at least two rows of stall diverters. This requires less installation components and makes efficient use of the space in the barn above the animals.

The supplying of air to the manifold may be performed either by blowing air into the manifold or by sucking air into the manifold.

DETAILED DESCRIPTION

In the following the invention is described in more detail with reference to the embodiments shown in the accompanying drawings, in which.

Figure 1:
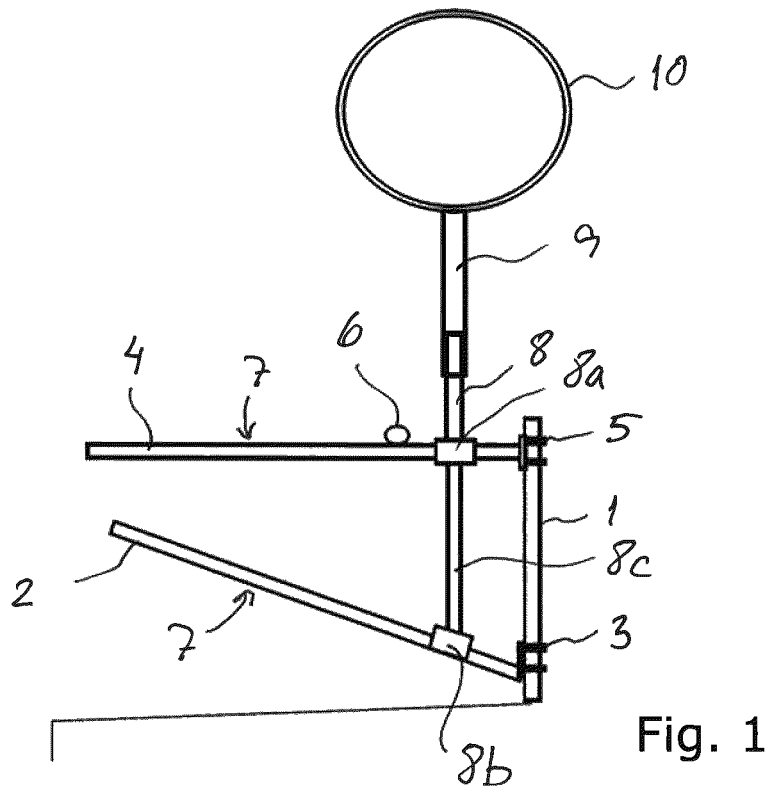
FIG. 1 is a schematic view of a first embodiment of the invention.
Figure 2:
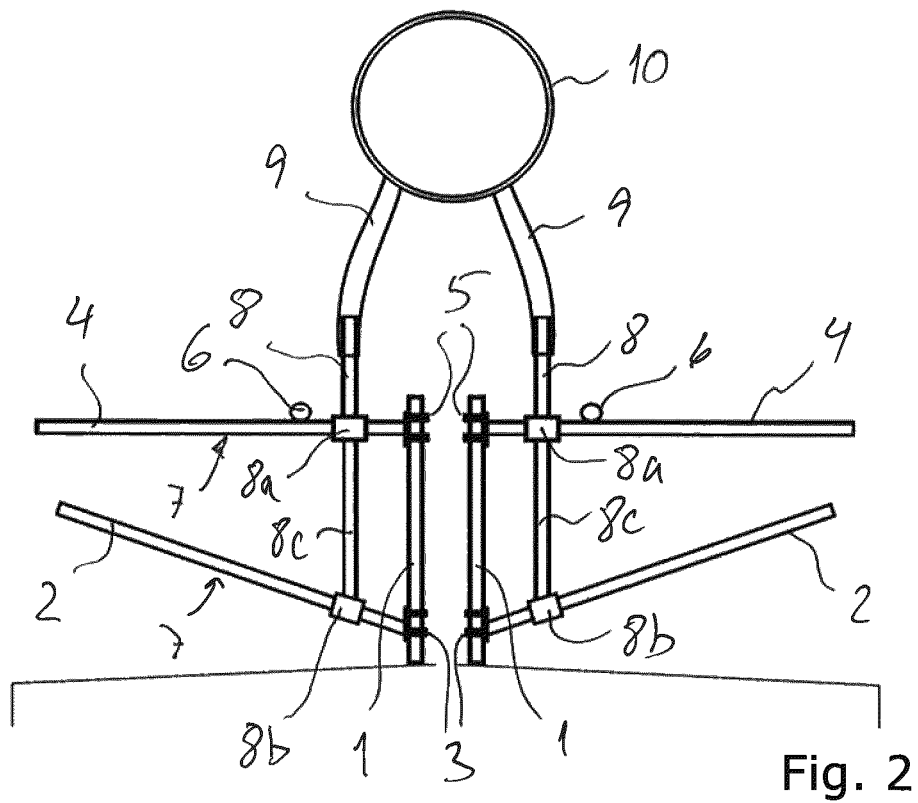
FIG. 2 is a schematic view of a second embodiment of the invention.
Figure 6:
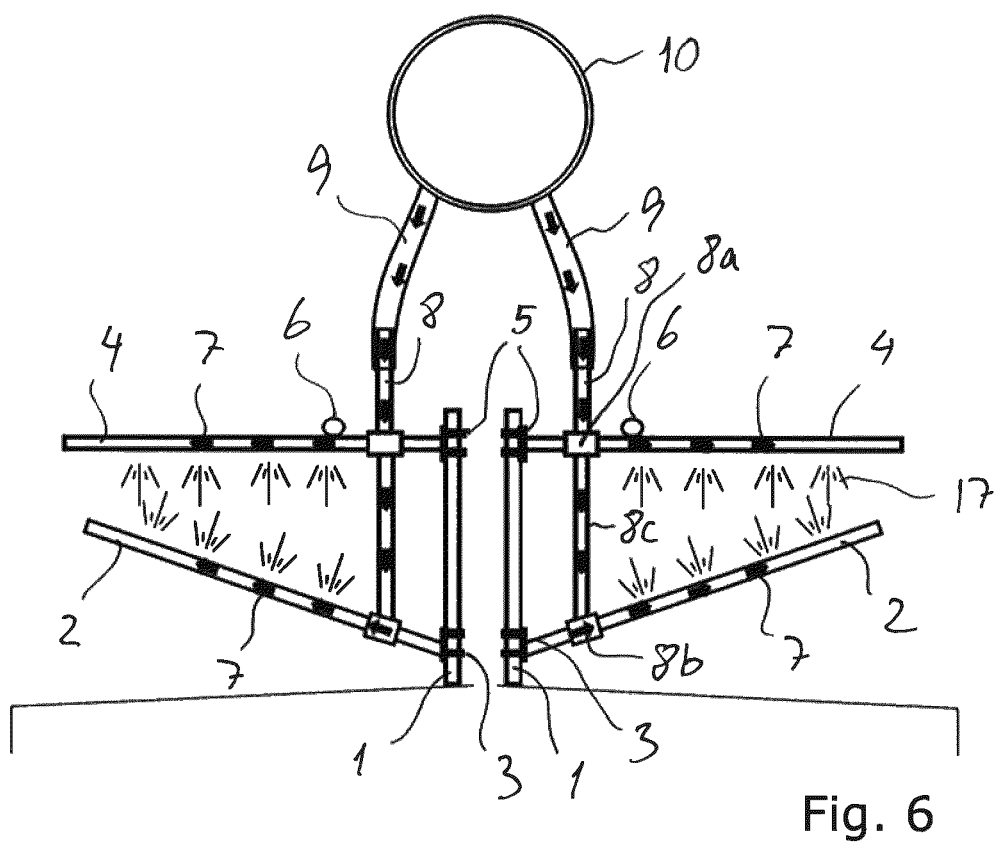
FIG. 6 is an illustration of the second embodiment of the invention of FIG. 2 with an example of the air ventilation.
Figure 7:
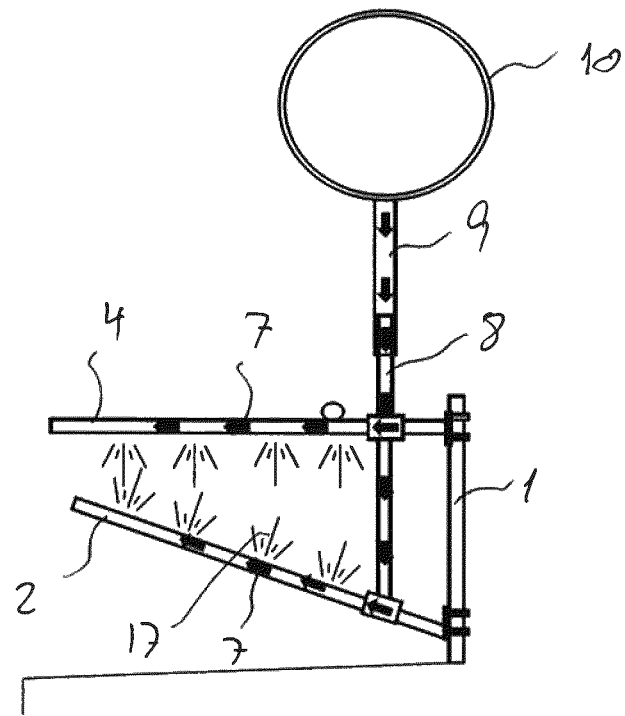
FIG. 7 is an illustration of the first embodiment of the invention of FIG. 1 with an example of the air ventilation.

With reference to the figures, there is shown a first and a second embodiment of a stall diverter system according to the invention, where a single row of compartments are provided in FIGS. 1 and 7 and in FIGS. 2 and 6 a second embodiment is shown where two rows of compartments for the animals are provided.

The stall divider system comprises a vertical support member 1 extending down into the ground or the floor of the stable. The vertical support member 1 may alternatively be mounted on a support structure in the ground or floor. The support member 1 may be hollow or solid and made of a rigid material such as iron, steel, wood, or similar materials. The support member 1 may have any cross-sectional shape, preferably square or circular. The dimensions of the vertical support member 1 may depend on the intended use of the stall dividers, e.g. type and size of the animals.

A lower member 2 may be mounted on the vertical support member 1 near the ground or the floor. One end of the lower member 2 may be secured to the vertical support member 1 at a certain position using a mounting fixture 3. The mounting fixture 3 may have a construction that enables it to be moved up or down on the support member 1. The mounting fixture 3 may be attached to the lower member 2 and/or the vertical support member 1 using bolts, screws, or any other type of fastening means. Alternatively, the lower member 2 may be mounted directly on the support member 1 using any type of fastening means or by welding or any similar process.

An upper member 4 may be mounted on the vertical support member 1 at the opposite end. The upper member 4 is secured to the vertical support member 1 at a certain position using a mounting fixture 5. The mounting fixture 5 may have a construction that enables it to be moved up or down on the support member 1.

The mounting fixture 5 may be attached to the upper member 4 and/or the vertical support member 1 using bolts, screws, or any other type of fastening means. The position of the upper member 5 may be adjusted according to different size animals. In a preferred embodiment the mounting fixtures 3, 5 may be identical.

In a preferred embodiment the lower member 2 extends further than the upper member 4. The lower member 2 and/or the upper member 4 may also be moved in the longitudinal direction according to the intended use of the stall dividers and the size of the animals.

The lower member 2 may extend away from the support member 1 at a predetermined angle relative to the longitudinal direction of the support member. The upper member 4 may extend away from the support member 1 at a second predetermined angle (such as substantially perpendicular) relative to the longitudinal direction of the support member. The upper member 4 may be angled differently relative to the support member 1, or at the same angle as the lower member 2. This enables the lower and upper members to be placed at optimum angles relative to the size of the animals.

Between the upper members 4 a crossing member 6 is provided. This crossing member 6 serves the function of a neck rail in the free stall set-up.

In the currently preferred embodiment, at least the upper member 4 is hollow and made of a tubular material, such as rigid materials such as iron or steel or bendable or deflectable materials such as glass fibre or a polymeric material. Preferably, also the lower member 2 is hollow. The hollow diverter members 2, 4 are preferably closed at their distal ends, i.e. their ends opposite the mounting fixtures 3, 5. At least one of the upper and lower diverter members 2, 4 are provided with apertures 7 (not shown in FIGS. 1 and 2, see FIGS. 6 and 7) so that air can escape from the hollow inner spaces of the tubular members 2, 4 through these apertures. The hollow inner spaces of the diverter members 2, 4 are connected to a supply tube 8 which receives air from an air supply and transfer the air via flow connectors 8a and 8b and an intermediate supply tube 8c.

Although not shown in the figures, the crossing member 6 may in some embodiments also be provided with apertures—or tubular members with air apertures—and connected to the air supply.

Besides the supply tubes 8 that are preferably relatively rigid so that an animal cannot bend, distort or other break the tube, the air supply also includes connection hoses 9 that connect the supply tubes 8 to a manifold 10, which as shown in the figures is provided above the row or rows (FIG. 1 and FIG. 2, respectively). The manifold 10 is preferably a large hose, which may be mounted hanging from the roof of the barn (not shown) in which the stall diverter system is installed. The manifold 10 is then connected via a hose piece 11 to a blower 12 (see e.g. FIGS. 4, 5 and 8-10).

Figure 3:
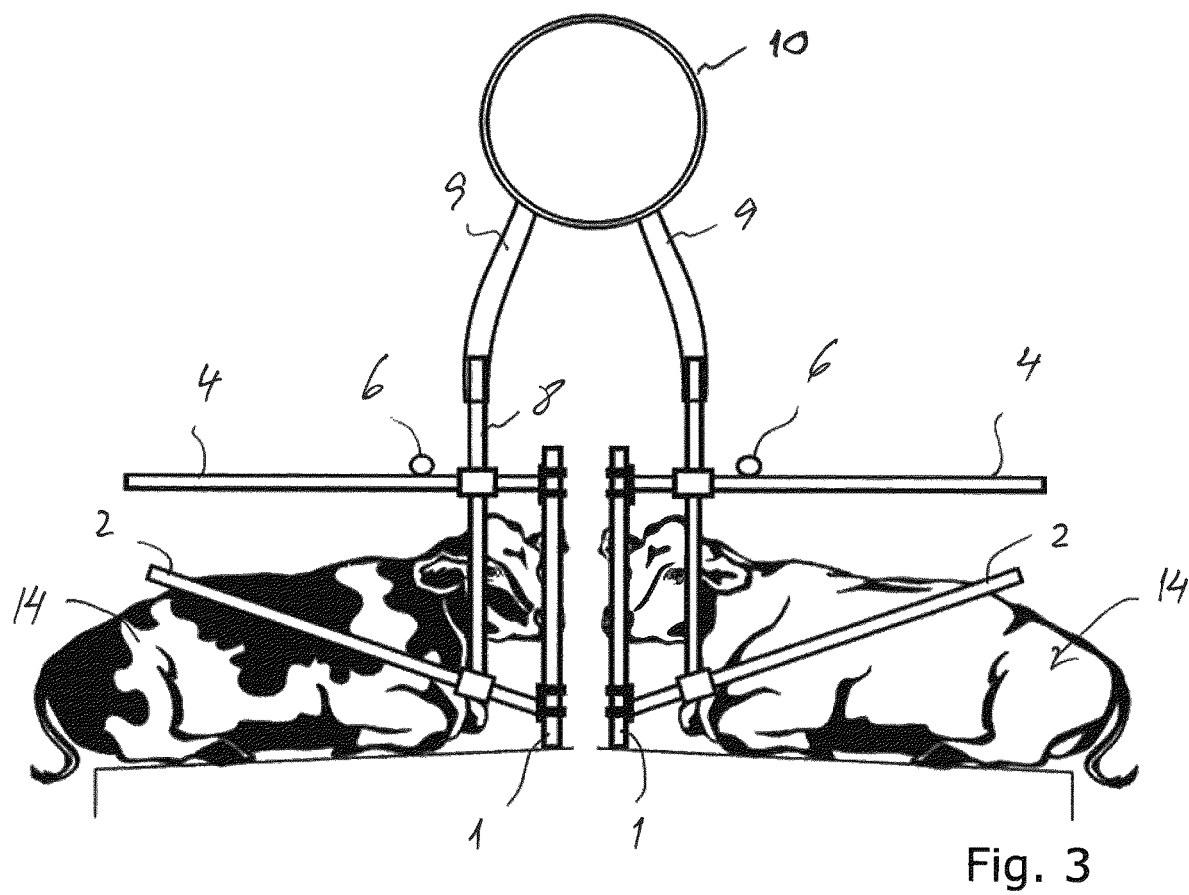
FIG. 3 is an illustration of the second embodiment of FIG. 2 in use.

The air flows from the manifold into the supply hoses and tubes 8, 9 and into the inner space of the diverter members 2, 4 and out through the apertures 7 whereby an air breeze 17 is created in the vicinity of the diverter members 2, 4. As it can be appreciated from the illustration in FIG. 3, the animals 14 will then experience a cooling breeze when they are in a compartment between neighbouring diverter members 2, 4 in the stall diverter system.

Figure 8:
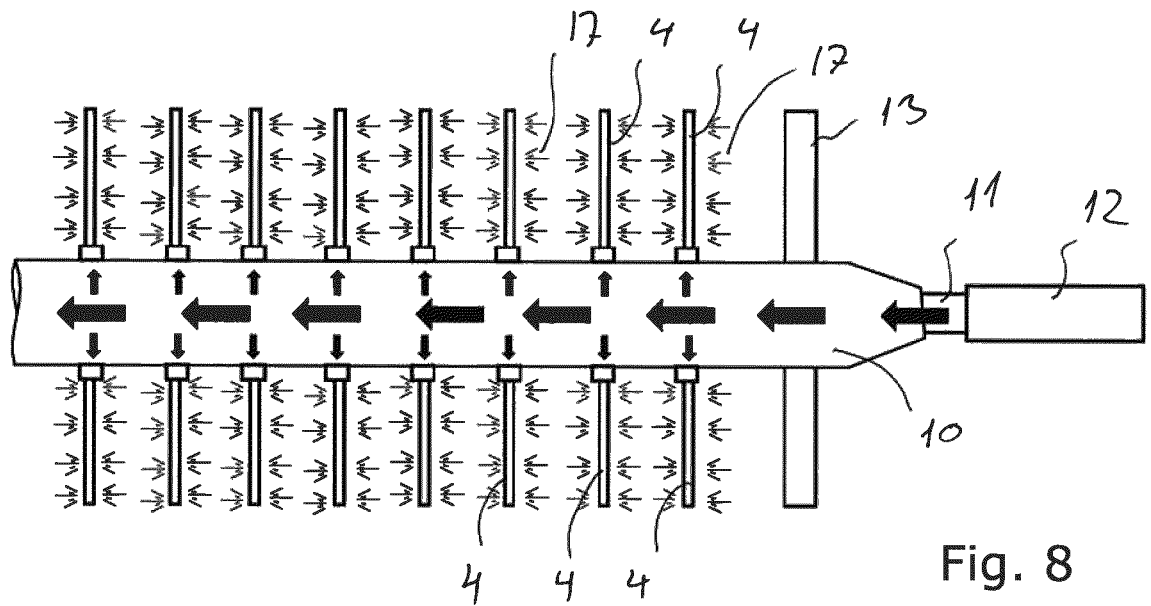
FIG. 8 is an illustration of the embodiment of the invention of FIG. 4 with an example of the air ventilation.

In the FIGS. 6-8, the embodiments of FIGS. 1-4 of the stall diverter system with the air supply are shown where the air breezes 17 are indicated.

Figure 4:
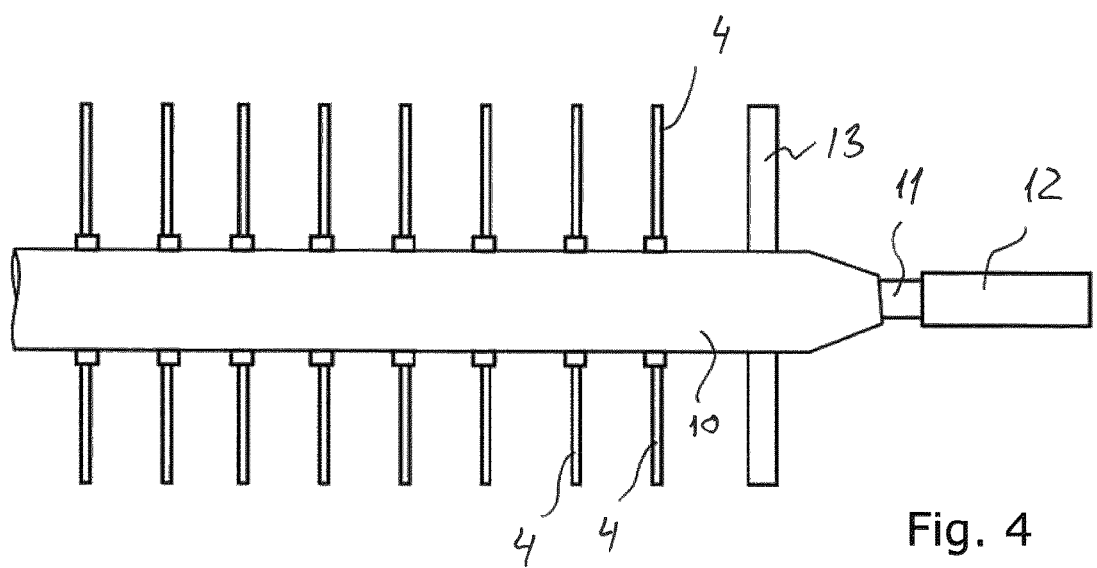
FIG. 4 is a schematic top view of a stall diverter system according to the second embodiment.
Figure 5:
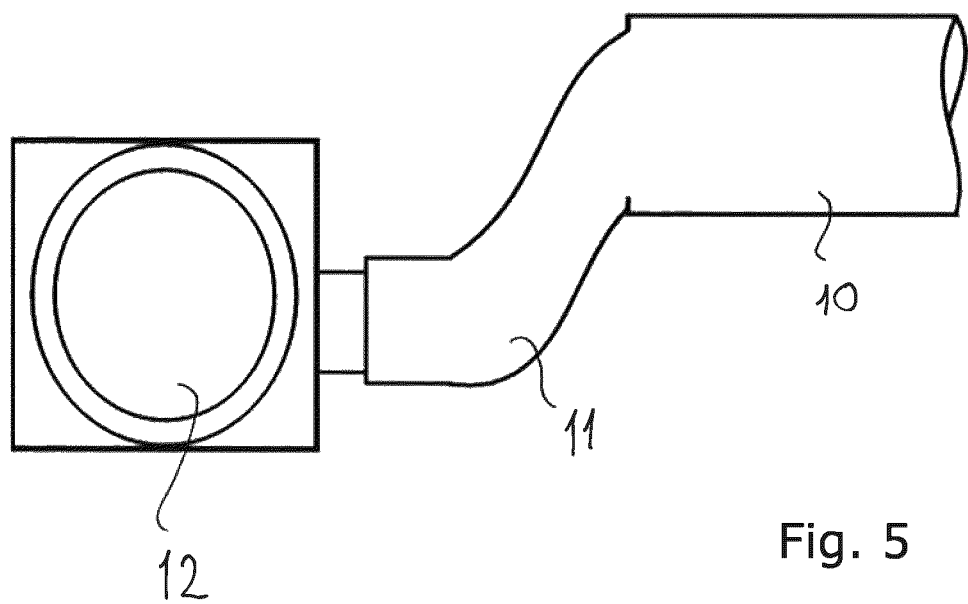
FIG. 5 is a detailed schematic view of the air supply of the invention.
Figure 10:
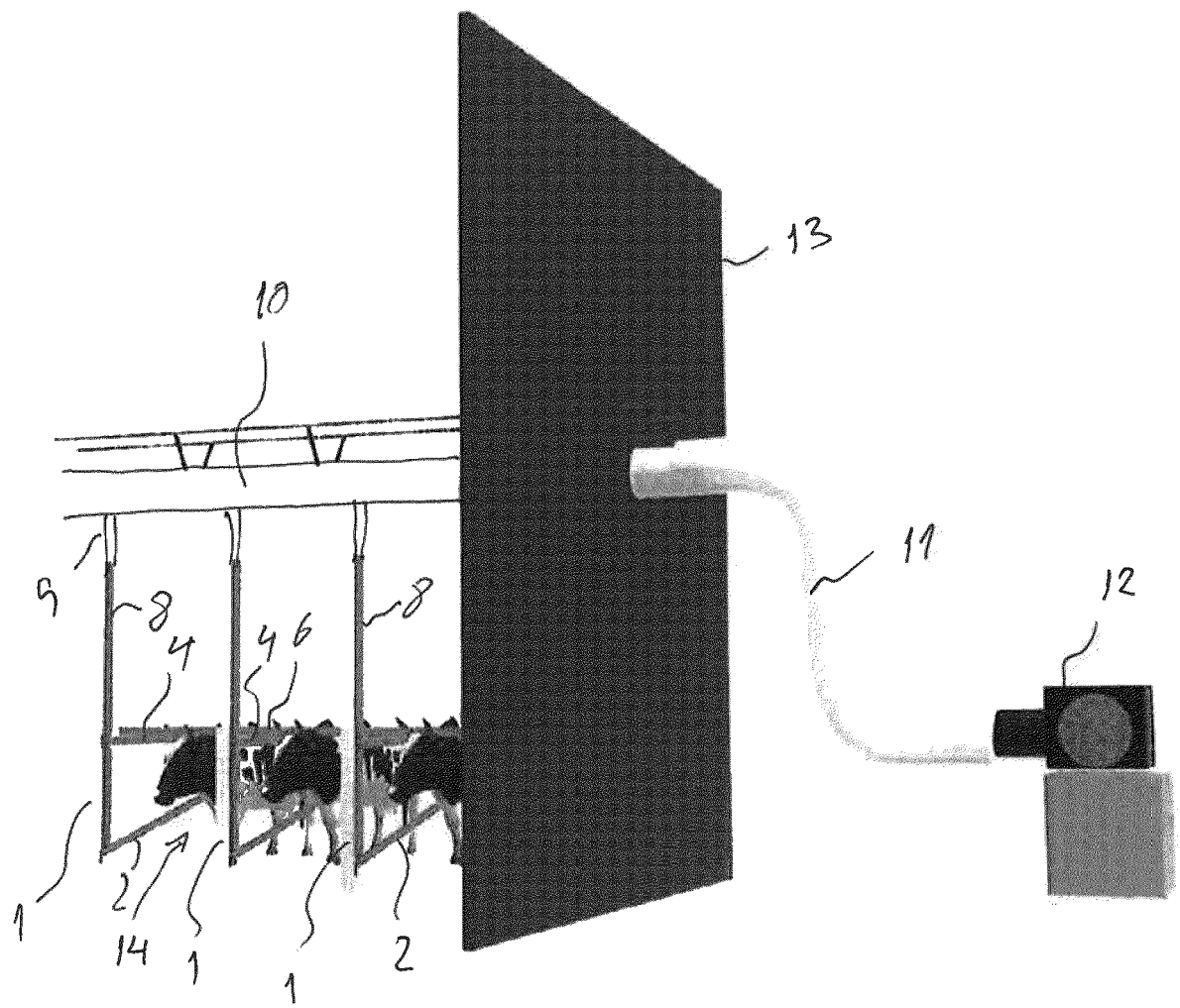

As shown in FIGS. 4, 6 and 10, the blower 12 may advantageously be positioned outside of the barn, i.e. on the outside of the exterior wall 13 of the barn. This is advantageous as fresh air can then be delivered into the free stable in the barn and then contribute to the ventilation of the barn and thereby to increase the welfare and comfort of the animals therein.

Figure 9:
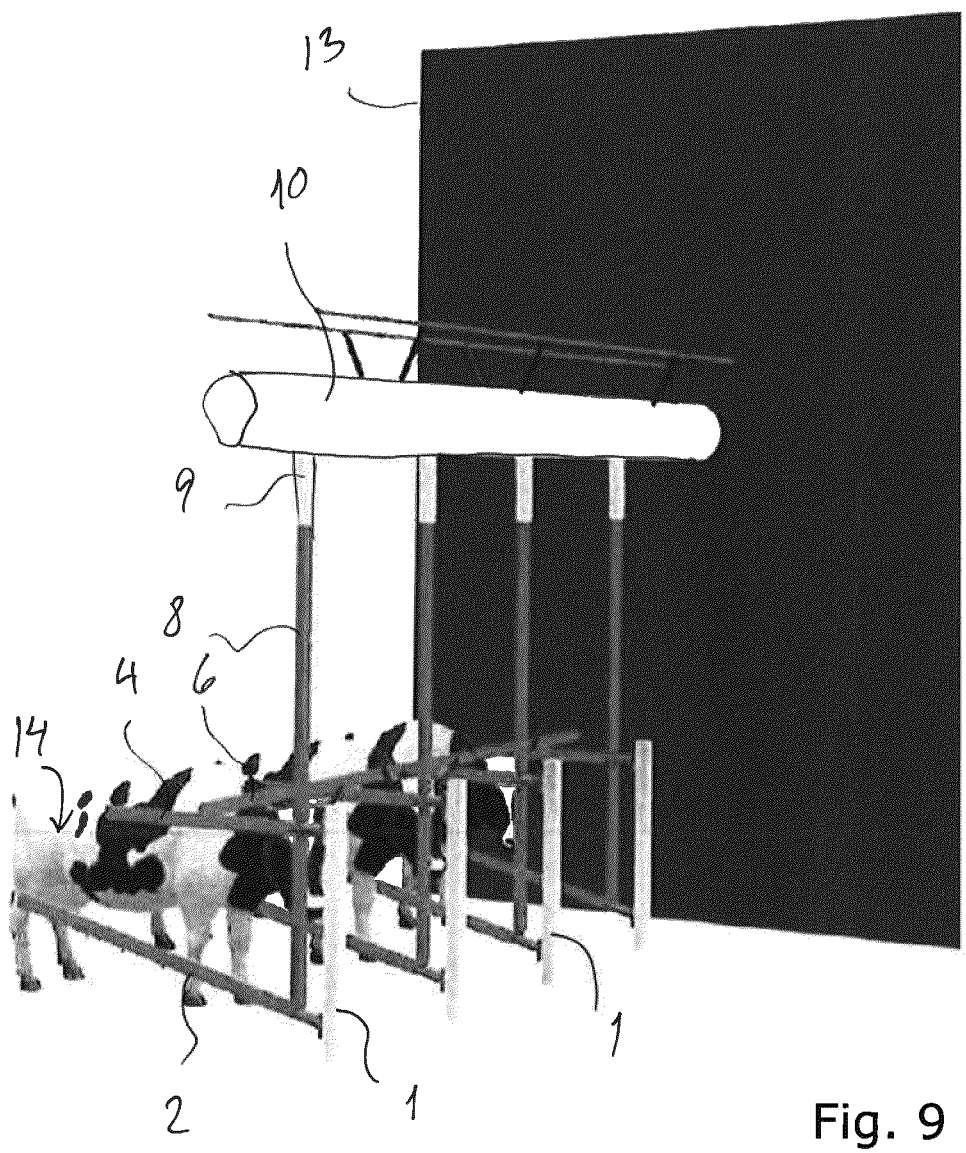
FIGS. 9 and 10 are perspective illustrations of an example of a stall diverter system in a free stable according to the invention.

In FIGS. 9 and 10, an example of a stall diverter system installed in a free stable building is shown, where the stall diverters are provided in a single row, such as also shown in e.g. FIG. 1.

In the current disclosure, the term "livestock" is meant to encompass all types of the domesticated animals raised and/or kept in an agricultural setting to provide labour and produce commodities.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A livestock stall diverter system for a free stall stable, said system comprising
   a plurality of stall dividers arranged in one or more rows comprising
   at least one vertical support member and at least one diverter member extending away from the at least one vertical support member, wherein
   the at least one diverter member is provided with at least one tubular member with a plurality of air apertures, and that
   the at least one tubular member is connected to an air supply.

2. The livestock stall diverter system according to claim 1, wherein the at least one tubular member is integrated in the at least one diverter member, which is provided as an elongated tubular member with an inner hollow space and with a plurality of air apertures, and that the hollow space is connected to an air supply.

3. The livestock stall diverter system according to claim 1, wherein the at least one diverter member comprises a plurality of diverter members that extend away from the at least one vertical support member.

4. The livestock stall diverter system according to claim 3, wherein the plurality of diverter members comprise an upper diverter member and a lower diverter member, wherein at least the upper diverter member is provided with air apertures.

5. The livestock stall diverter system according to claim 4, wherein the upper diverter member and the lower diverter member are formed in one piece with a curved distal section or connected to each other by a curved section.

6. The livestock stall diverter system according to claim 1, wherein the stall diverter system comprises at least one crossing member extending perpendicularly to the at least one diverter members, and arranged on the upper diverter members by being mounted thereon.

7. The livestock stall diverter system according to claim 6, wherein any one of the at least one diverter member or the at least one crossing member is provided with a coating of a soft or elastic material.

8. The livestock stall diverter system according to claim 6, wherein at least one of the at least one diverter member, the at least one vertical support member, and the at least one crossing member is made of metal tubes.

9. The livestock stall diverter system according to claim 6, wherein at least one of the at least one diverter member, the at least one support member and the at least one crossing member is made of a bendable or deflectable material.

10. The livestock stall diverter system according to claim 1, wherein the air supply comprises an air supply source and a manifold for supplying air to a plurality of tubular members.

11. The livestock stall diverter system according to claim 10, wherein the manifold is connected to a series of supply tubes for providing fluid communication between the manifold and each of the tubular members.

12. The livestock stall diverter system according to claim 10, wherein the manifold is connected to an air supplier for providing an airflow in the manifold and into the plurality of tubular members and out through the apertures therein.

13. The livestock stall diverter system according to claim 10, wherein the manifold is a flexible hose adapted for being mounted above the stall diverters.

14. The livestock stall diverter system according to claim 10, wherein the air supply source is an air blower or an air suction provider.

15. The livestock stall diverter system according to claim 1, wherein the at least one tubular member is provided with a plurality of air apertures and is attached to the at least one diverter member and connected to the air supply.

16. A free stall stable comprising a livestock stall diverter system as defined in claim 1, wherein at least a single row of support posts is provided with diverter members pointing in a first direction and with a manifold provided above said row of support posts and providing air supply to the at least one diverter members of the at least one row of support posts.

17. The free stall stable according to claim 16, wherein at least a second row of support posts are provided with diverter members pointing to a second direction opposite of the first directions and with a common manifold provided above said rows and providing air supply to the tubular members of both at least two rows of support posts.

18. A method of providing air conditioning for animals in a free stall stable, said method comprising the steps of
providing a livestock stall diverter system according to claim 1, comprising
a plurality of stall dividers arranged in one or more rows comprising at least one vertical support member and at least one diverter member extending away from the vertical support member, wherein
the at least one diverter member is provided with a tubular member with a plurality of air apertures, and the at least one tubular member is connected to an air supply, where the tubular member is incorporated in the at least one diverter member, which is provided as an elongated tubular member with an inner hollow space and with a plurality of air apertures, and the hollow space is connected to the air supply, and
providing an airflow through the apertures in the at least one diverter member by providing a manifold which is in fluid communication with the hollow space of said at least one diverter member, and
supplying air to said manifold.

19. The method according to claim 18, whereby an airflow is provided by the manifold provided above said one or more rows of stall diverters, and whereby the manifold is common to at least two rows of stall diverters.

20. The method according to claim 18, whereby the supplying of air to the manifold is performed by blowing air into the manifold or whereby the supplying of air to the manifold is performed by sucking air into the manifold.

* * * * *